United States Patent [19] [11] Patent Number: 4,679,081
Tsugane et al. [45] Date of Patent: Jul. 7, 1987

[54] SYSTEM FOR CODING VIDEO SIGNAL IN BLOCK UNIT

[75] Inventors: Syuzo Tsugane; Mitsuo Nishiwaki, both of Tokyo, Japan

[73] Assignee: NEC Corporation, Tokyo, Japan

[21] Appl. No.: 796,690

[22] Filed: Nov. 12, 1985

[30] Foreign Application Priority Data

Nov. 9, 1984 [JP] Japan ................................ 59-236226

[51] Int. Cl.[4] ........................ H04N 1/40; H04N 7/12
[52] U.S. Cl. .................................... 358/138; 358/136; 358/260
[58] Field of Search ................ 358/136, 138, 260, 280

[56] References Cited

U.S. PATENT DOCUMENTS 3,976,831 8/1976 Danell et al. ...................... 358/138
4,202,011 5/1980 Koga .................................... 358/136
4,310,853 1/1982 Madson .......................... 358/138 X
4,460,923 7/1984 Hirano et al. ..................... 358/136

*Primary Examiner*—E. A. Goldberg
*Assistant Examiner*—Patrick W. Foster
*Attorney, Agent, or Firm*—Sughrue, Mion, Zinn, Macpeak & Seas

[57] ABSTRACT

A system for coding video signals e.g. television signals in block units is disclosed. The coding system comprises a synchronization detector for detecting a frame synchronization from the video signal, and a block former operative to divide the video signal in block units per a predetermined number of lines by using a picture frame synchronization signal detected by the synchronization detector as a reference. When the number of lines included in a block immediately before the subsequent picture frame synchronization signal is less than the predetermined number of lines, the block former designates the block as an ineffective block. The coding system further comprises a coder operative to apply a coding processing to the blocks except for the ineffective block designated by the block former in accordnace with a predetermined coding procedure, and transmitter operative to multiplex coded data outputted from the block former and coder, position information of the first block immediately after the picture frame synchronization signal, and the number of lines within the ineffective block so as to transmit the multiplexed signal thus obtained. Thus, when the input video signal is asynchronously switched, the coding system necessarily executes only a processing per each block, thus providing a reproduced picture image free from distortion on the side of a receiving station.

5 Claims, 7 Drawing Figures

SYSTEM FOR CODING VIDEO SIGNAL IN BLOCK UNIT

BACKGROUND OF THE INVENTION

The present invention relates to a system for dividing a video signal outputted from a television camera into blocks to effect a bandwidth compressive coding based on a predictive coding or code transform scheme.

An example of such a predictive coding system is disclosed in U.S. Pat. No. 4,460,923. The predictive coding system comprises a scan converter in which a plurality of blocks are formed to convert an input video signal into a block formation video signal, a subtractor to make the difference between the block formation video signal suitably delayed and a prediction signal from a prediction signal generator to be referred to soon to generate a prediction error signal, a quantizer to limit the number of possible levels of the prediction error signal, and a code compressor responsive to the quantized prediction error signal from the quantizer to generate compressed information which will be transmitted to a transmission path. The predictive coding system further comprises an adder for adding the quantized prediction error signal to the prediction signal to generate a locally decoded signal, the prediction signal generator operative to generate a prediction signal by using the delayed local decoding signal and in accordance with information signifying an optimum prediction function (motion vector) supplied from an optimum prediction detector. Thus, the above-mentioned predictive coding system makes it possible to determine a motion vector in accordance with both motion vector information and prediction error information, thereby providing a remakably improved coding efficiency especially where the transmission speed is low. Accordingly, such a predictive coding system is especially effective where a television signal undergoes compressive coding and is transmitted at a low speed.

Ordinarily, the coding system of this kind effects code conversion in block units defining a picture frame. Namely, such a coding system is configured to determined the number of lines to be included in each block so that a muiltiple of integer of a predetermined number of lines for each block unit is equal to the number of scanning lines of a picture frame to transmit the first block position information including picture frame synchronization position information and information regarding which line within the first block position information corresponds to a synchronization position of the picture frame.

However, the drawback with the conventional system for coding video signal in block unit is as follows. For instance, when an NTSC color television signal having 525 scanning lines within a picture frame is employed, a predetermined line number defining a block unit is limited to the value selected from 3, 5, 7, 15 and 25 etc. For this reason, irregular processing is required in the configuration of hardware. Attention is drawn to e.g. a system provided with two cameras operative asynchronously with each other. In case where one camera A is switched to the other camera B, when the line number within the last block of the picture frame given by the camera B is different from that within the last block of the picture frame given by the camera A, a particular hardware for processing this is required.

SUMMARY OF THE INVENTION

With the above in view, an object of the present invention is to provide a system for coding a video signal in block units making it possible to realize block formation using an arbitrary number of lines as a unit.

Another object of the present invention is to provide a coding system which necessarily executes only a processing per each block even when an input video signal is asynchronously switched, thus providing a reproduced picture image free from distortion on the side of a receiving station.

To achieve these objects, a system for coding a video signal in block unit according to the present invention comprises block forming means operative to divide a video signal per a predetermined line number determined using a picture frame synchronization signal as a reference such that when the number of lines included in a block immediately before the subsequent picture frame synchronization signal is less than the predetermined number of lines, the block forming means designates the block as an ineffective block, coding means operative to apply a coding processing to each block except for the ineffective block in accordance with a predetermined coding procedure, and transmitting means operative to multiplex coded data outputted from the coding means, the first block position information immediately after the picture frame synchronization signal, and the number of lines within the ineffective block to transmit the multiplexed signal thus obtained.

BRIEF DESCRIPTION OF THE DRAWINGS

The features and advantages of a system for coding a video signal in block unit according to the present invention will become more apparent from the following description taken in conjunction with the accompanying drawings, in which.

DESCRIPTION OF THE PREFERRED EMBODIMENT

A preferred embodiment of a system for coding video signal in block units according to the present invention will be described with reference to attached drawings.

Figure 1A:
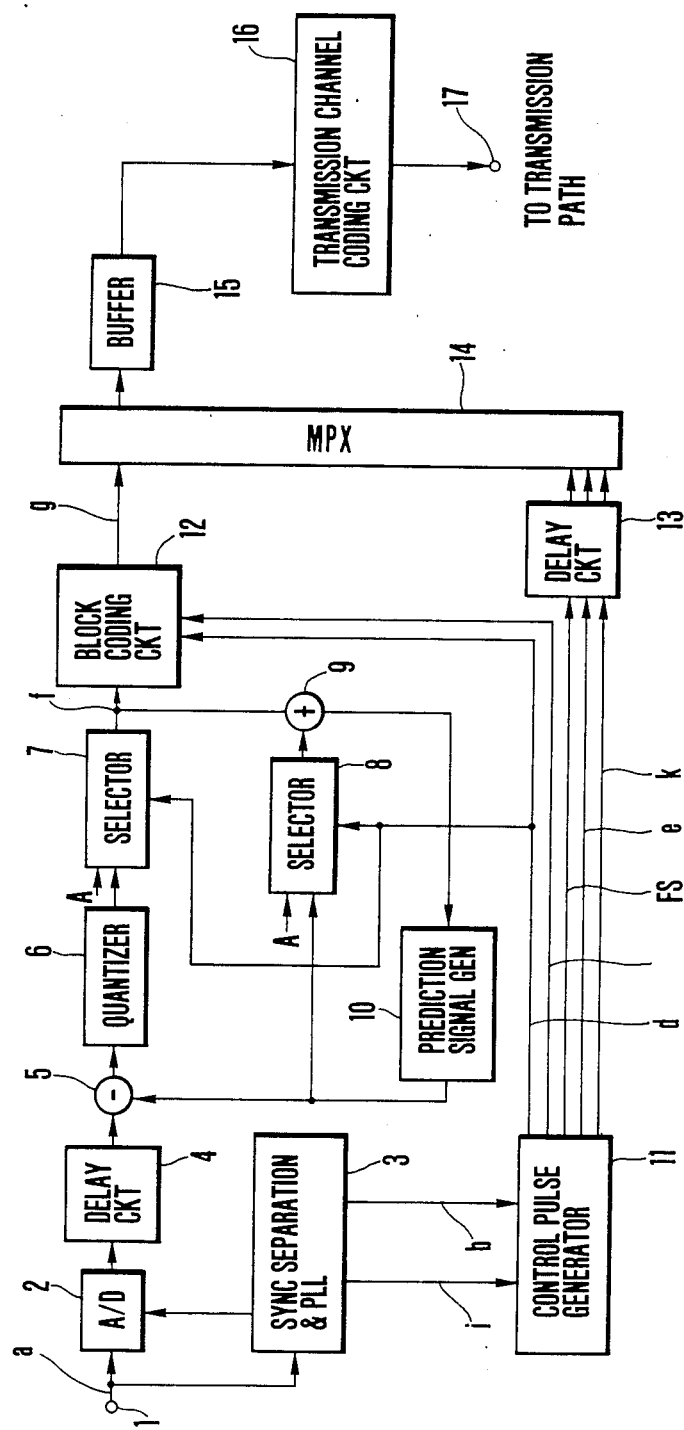
FIG. 1A is a block diagram illustrating an example of a transmitting station in a picture image frame position information transmission system according to the present invention.

FIG. 1A is a block diagram showing an example of a coding system, which is located on the side of a transmitter and operates to transmit a signal to a decoding system on the side of a receiver.

A video signal inputted to an input terminal 1 is supplied to an A/D converter 2 and then converted into a digital signal thereby. The digital signal thus obtained is delivered to a subtractor 5 through a delay circuit 4. The subtractor 5 is operative to calculate the difference between the digital video signal and a prediction signal delivered from a prediction signal generator 10 to apply the prediction error signal f thus obtained to a quantizer 6. The quantizer 6 is operative to quantize the prediction error signal to deliver the quantized signal to a first selector 7. The first selector 7 responds to a control pulse signal (reset line signal i.e. ineffective block signal d) from a control pulse generator 11 to select a fixed value A when the quantized output belongs to a predetermined line, thereby feeding the fixed value A thus selected to a block coding circuit 12. The block coding circuit 12 is operative to apply a block coding processing to the output of the first selector 7 to feed the signal thus coded to a multiplexer circuit 14. The coding system in this embodiment is further provided with a second selector 8. The second selector 8 responds to the reset line signal d from the control pulse generator 11 to select a fixed value A when the prediction signal belongs to a predetermined line to feed the fixed value A thus selected to an adder 9. In the adder 9, the output from the second selector 8 is added to the output from the first selector 7. The prediction signal generator 10 responds to the output of the adder 9 to generate a prediction signal. The input video signal is also fed to a synchronization separating and PLL (phase locked loop) circuit 3 to extract a horizontal synchronization signal i and a frame synchronization signal code b. In accordance with these synchronizing signals i and b, the control pulse generator 11 produces various kinds of control signals i.e. reset line signal d, block line signal c, frame synchronization signal FS, ineffective line information (the number of lines included within the ineffective line) e, and a carry out signal k. These signals, FS, e, k and a coded video signal g are multiplexed in the multiplexer circuit 14. Thereafter, the multiplexed signal is stored into a buffer memory 15. The output of the buffer memory 15 is converted into a coded signal e.g. an alternate mark inversion (AMI) code signal suitable for a transmission channel in a transmission channel coding circuit 16. The coded signal thus obtained is outputted to a transmission channel from an output terminal 17.

Figure 1B:
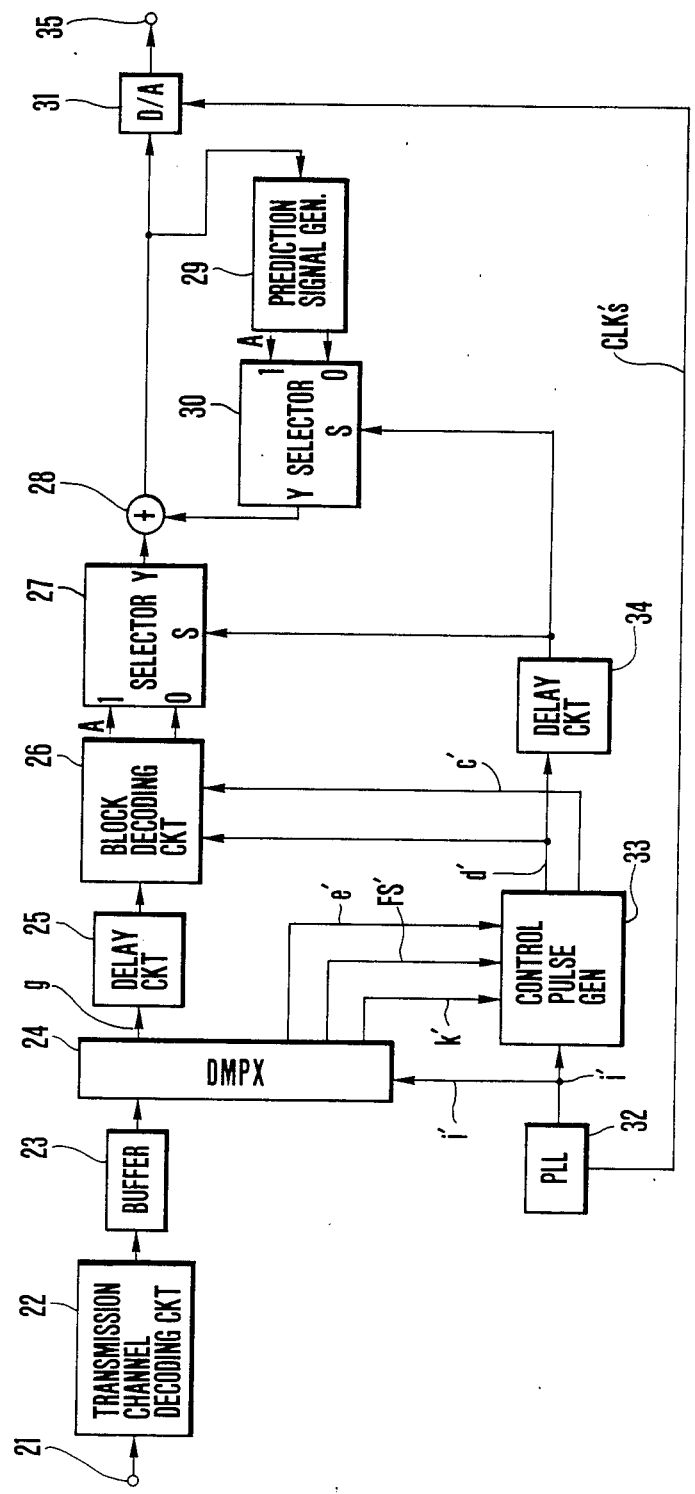
FIG. 1B is a block diagram illustrating an example of a receiving station in the picture image frame position information transmission system according to the present invention.

FIG. 1B is a block diagram showing an embodiment of the decoding system in accordance with the present invention. In the figure, the video signal which has been coded by means of the predictive coding system of FIG. 1A and provided with compressed information is supplied to an input terminal 21 via a transmission path. The input video signal is decoded in a transmission channel decoding circuit 22. The signal thus decoded is delivered to a buffer memory 23 and is stored thereinto. The output of the buffer memory 23 is separated into a code formation signal g, ineffective line information e', frame synchronization signal FS' and carry-out signal k' in a separation circuit or DMPX (demultiplexer) 24. The code formation signal g delivered through a delay circuit 25 is decoded in a block decoding circuit 26 in response to a block line signal c' and a reset line signal d' from a control pulse generator 33 which will be referred to later. The signal thus decoded is fed to a selector 27. The control pulse generator 33 is operative to generate the block line signal c' and the reset line signal d' on the basis of the frame synchronization signal FS', the ineffective line information c' and the carry-out signal k'. The selector 27 is operative to select either a fixed value A or an output signal from the block decoding circuit 26 in response to the reset line signal d', delayed by a delay circuit 34, to feed a selected one as a prediction error signal to an adder 28. The decoding system is further provided with a second selector 30 operative to select either a fixed value A or an output signal from a prediction signal generator 29 in response to the delayed reset line signal d' to feed a selected one as a prediction signal. The adder 28 is operative to add the output (i.e. the prediction error signal) from the selector 30 to the prediction error signal from the selector 27 to generate a digital video signal. The digital video signal thus obtained is converted into an analog signal in a D/A converter 31 to reproduce the original analog signal which will be transmitted from an output terminal 35 to a transmission path.

Figure 2:
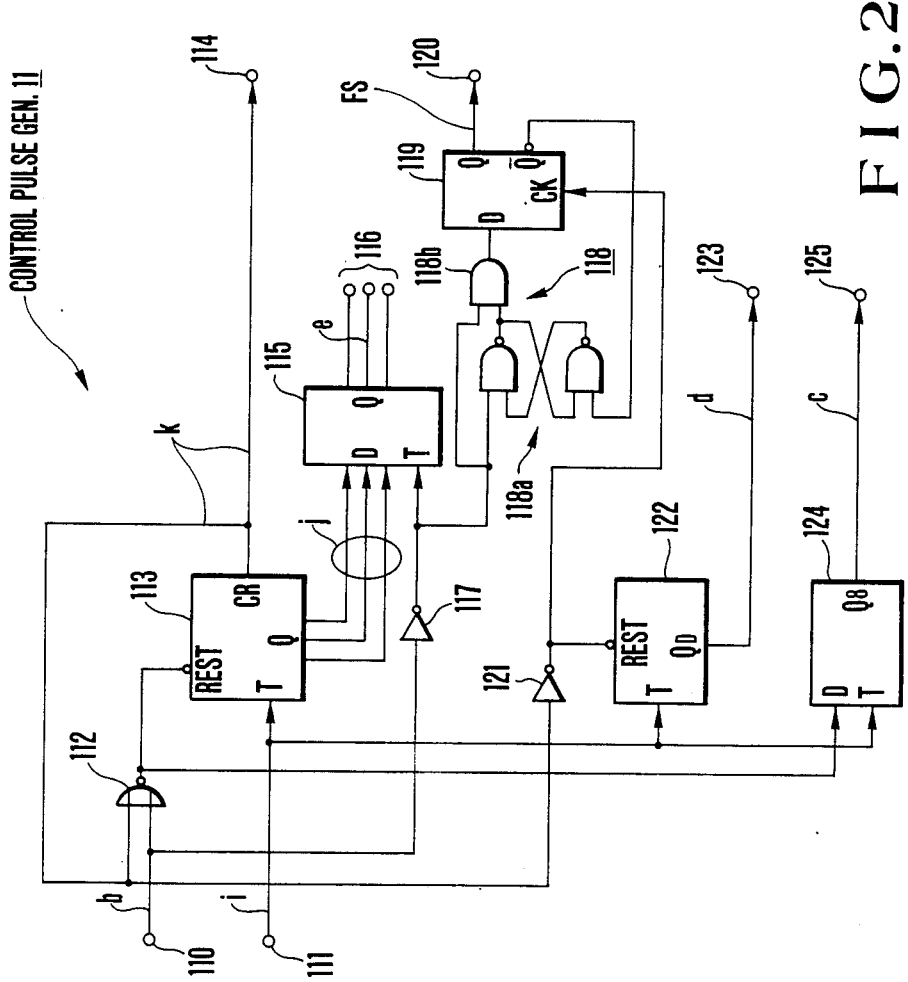
FIG. 2 is a circuit diagram illustrating details of a control pulse generator provided in the transmitting station shown in FIG. 1A.

FIG. 2 shows details of the control pulse generator 11 provided in the coding system shown in FIG. 1A. The control pulse generator 11 is provided with a first input terminal 110 for the frame synchronization signal code b and a second input terminal 111 for the horizontal synchronization signal i per each line. A NOR gate 112 performs a logical sum of the frame synchronization signal code b and a carry output k from a carry output terminal CR of a counter 113 serving as a ⅛ frequency divider to deliver an output to a reset terminal REST of the counter 113. The counter 113 is operative to produce an one-eighth of the frequency of the horizontal synchronization signal i per each line for dividing the horizontal synchronization signal into suitable blocks. Each counter output value j from the output terminal Q of the counter 113 is inputted to a register 115. In response to a signal from an inverter 117, which corresponds to a clock at a time when the subsequent frame synchronization signal code b is inputted, the contents of the register 115 are updated to produce an output indicative of the number e of lines included in an ineffective block from an output terminal 116 of 3 bits. Further, the inverted frame synchronization signal code b is inputted to a logic circuit 118 comprising a flip-flop 118a and an AND gate 118b. The AND gate 118b performs logical product of the inverted signal b and a Q output from the flip-flop 118a to deliver an output thus obtained to the next stage of a flip-flop 119. The flip-flop 119 produces an output from the Q̄ output terminal as a frame synchronization signal FS. In this flip-flop 119, the other output from the Q output terminal is inputted to an AND gate constituting the flip-flop 118a of the logic circuit 118 as indicated. In addition, a signal obtained by inverting the carry out signal k by an inverter 121 which will be referred to soon is delivered to a clock terminal CK of the flip-flop 119 as a clock signal. As previously described, the carry out signal k from the counter 113 is inverted by the inverter 121. The signal thus inverted is also inputted to a reset terminal REST of a binary counter 122. The binary counter 122 is operative to count the horizontal synchronization signal i. In case where a signal appearing at the reset terminal does not represent "0", when the signal i corresponding to more than 8 lines passes, an ineffective block signal d having a logical level of "1" is outputted from a terminal $Q_D$. This ineffective block signal d is outputted from an output terminal 123. The control pulse generator 11 is further provided with a shift register 124 operative to delay the output signal from the NOR circuit 112 by a time corresponding to 8 lines to output the delayed signal c from an output terminal 125.

Figure 3:
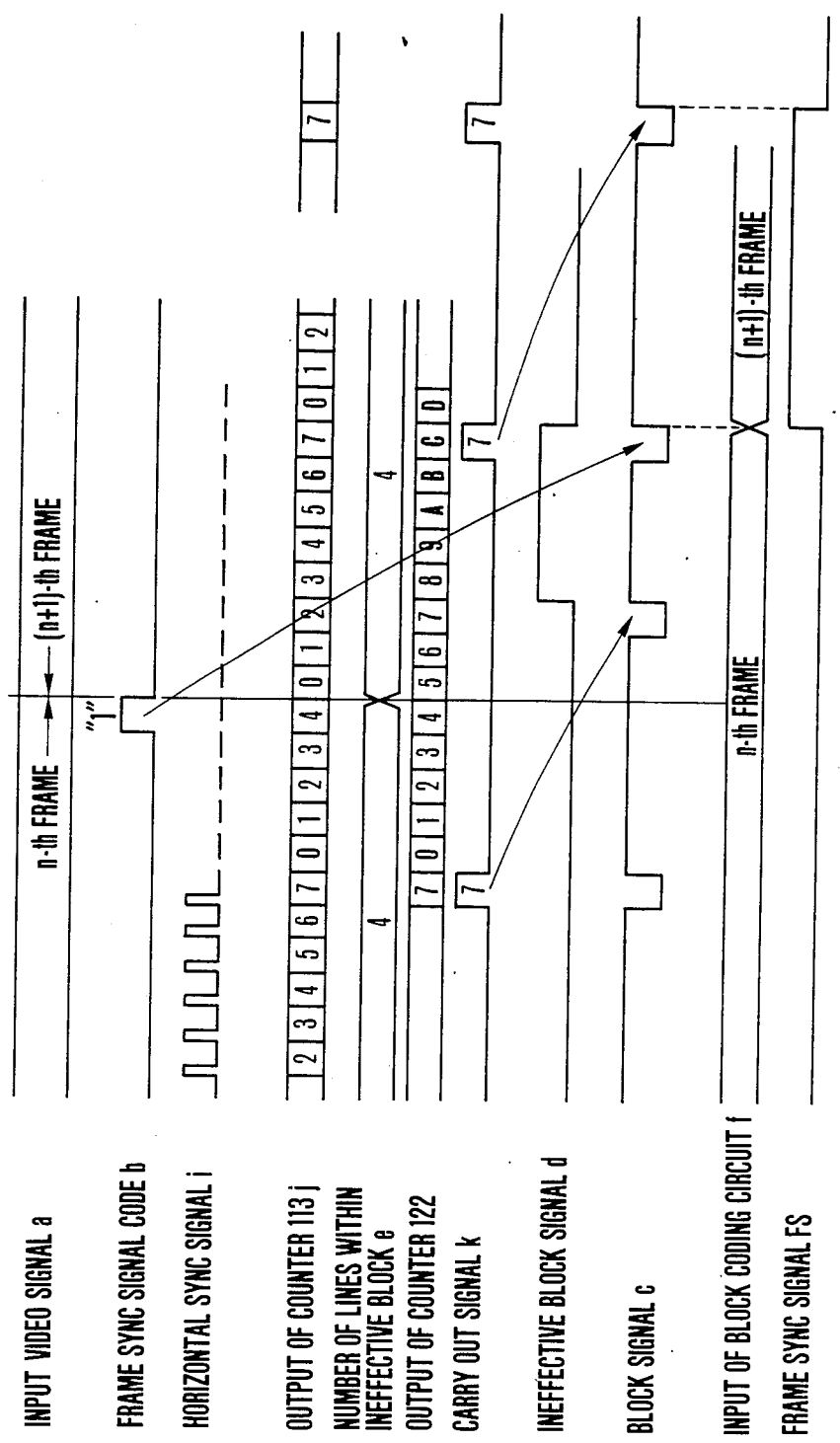
FIG. 3 shows a timing chart of the control pulse generator shown in FIG. 2.

The operation of the coding and decoding system shown in FIGS. 1A, 1B and 2 will be described with reference to FIG. 3. The frame synchronization signal code b outputted from the synchronization separation and PLL circuit 3 represents logical "1" during a time period corresponding to the signal line at a boundary of the frame. The frame synchronization signal code b showing logical "1" is inputted to the reset terminal of the counter 113 (FIG. 2). Thus, the counter 113 initializes the counting operation to count up the horizontal synchronization signal i during one frame period to sequentially produce outputs corresponding to 8 lines as the output signal j. In this embodiment, the number of scanning lines included in one frame is 525. Accordingly, modulo 8 operation i.e. MOD (525, 8) is equal to 5 (five). As seen from the signal j shown in FIG. 3, the value immediately before it is reset by the frame synchronization signal code b is equal to 4 (four). In this instance, five lines corresponding to 0 to 4 are included within the ineffective block. These five lines are outputted from the output terminal 116 as the output signal e. On the other hand, the carry-out signal k from the counter 113 is outputted regularly every 8 lines in the middle of each frame. Accordingly, a signal appearing at the output terminal $Q_D$ of the binary counter 122 always represents "0" level. However, in case where the carry-out signal k is not outputted from a time period more than 8 lines, the signal appearing at the output terminal $Q_D$ represents "1" level only during the concerned period until the reset signal is inputted. The signal thus obtained is outputted to the block coding circuit 12 as the ineffective block signal d. It takes a time corresponding to 8 lines for performing judgement of the ineffective block signal d. For this reason, it is necessary that phases of the block signal are coincident with each other. To realize this, an operation is applied to delay the block signal by a time period corresponding to 8 lines by using the shift register 124. Likewise, the picture signal a is delayed by a time period corresponding to 8 lines by using the delay circuit 4.

Figure 4:
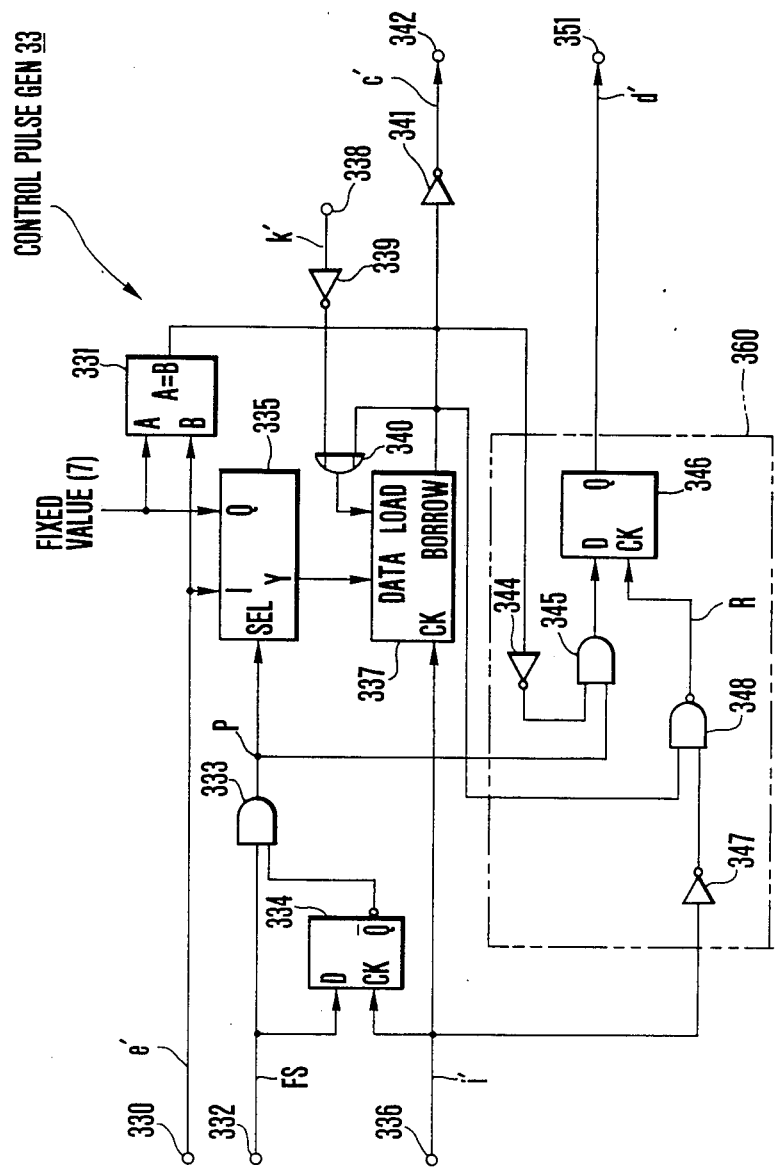
FIG. 4 is a circuit diagram illustrating details of a control pulse generator provided in the receiving station shown in FIG. 1B.
Figure 5:
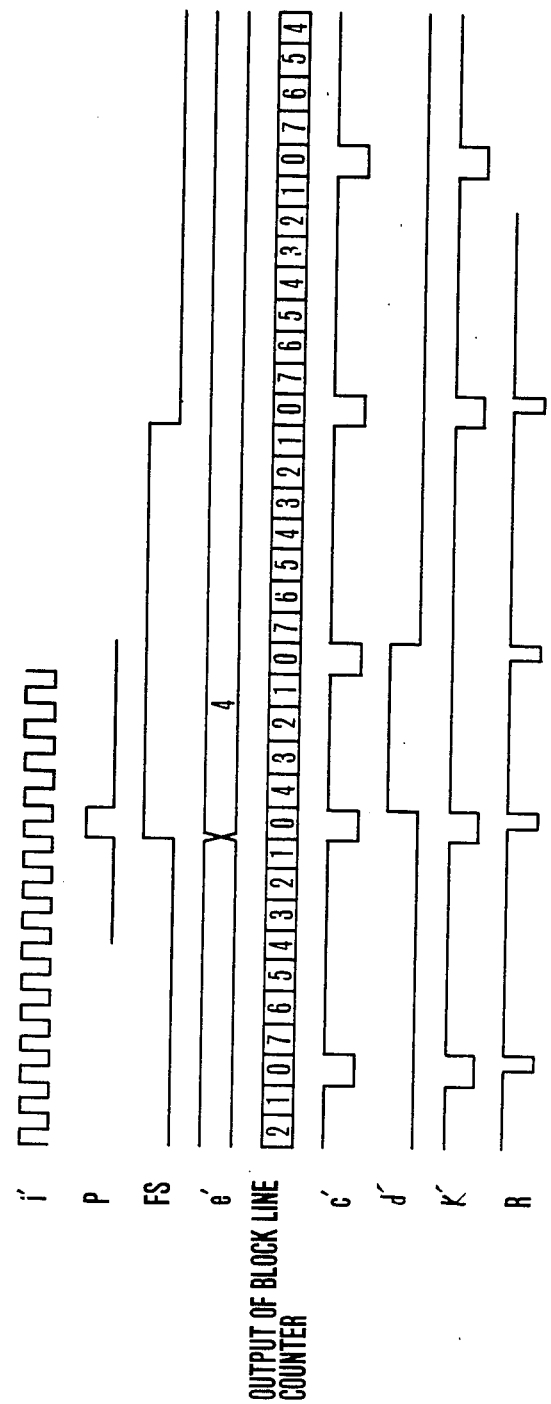
FIG. 5 shows a time chart of the control pulse generator shown in FIG. 4.

FIG. 4 shows a circuit arrangement of the control pulse generator 33 provided in the decoding system shown in FIG. 1B. FIG. 5 shows a time chart of the control pulse generator 33. The signal e' indicative of ineffective line number inputted to an input terminal 330 is delivered to a B input terminal of a comparator 331. To an A input terminal of the comparator 331, a fixed value e.g. 7 (seven) is inputted. When the output of the ineffective line information e' is equal to 7 (i.e. A=B), the comparator 331 produces a coincidence output. The frame synchronization signal FS inputted to an input terminal 332 is delivered to an AND gate 333 and to a flip-flop 334. To a clock terminal CK of the flip-flop 334, the horizontal synchronization signal i' delivered to an input terminal 336 is inputted. The AND gate 333 performs logical product of the frame synchronization signal FS and a $\bar{Q}$ output of the flip-flop 334. When an output p from the AND gate 333 is inputted to an input terminal SEL of a selector 335, the selector 335 selects the ineffective line information e', while when the output P is not inputted to the input terminal SEL, the selector 335 selects the fixed value of 7. The horizontal synchronization signal i' delivered to the input terminal 336 is inputted to a clock terminal of a block line counter 337 constituted by a down counter. The carry-out signal k' delivered to an input terminal 338 is inverted by an inverter 339. An OR gate 340 performs logical sum of the inverted signal k' and an output from a borrow terminal BORROW of the block line counter 337. The block line counter 337 is operative to load the output of the selector 335 which is inputted to its input DATA to count down the output thus loaded. The control pulse generator 33 is further provided with a logic circuit 360 operative to inhibit outputting of the reset line signal d' when the AND gate 333 outputs the signal P and the fixed value of 7 is counted. The logic circuit 360 comprises inverters 344 and 347, an AND gate 345, a NAND gate 348 and a flip-flop 346. An output signal of the inverter 347 is supplied to one input of the NAND gate 348. The output (BORROW) of the block line counter 337 is inverted by an inverter 341 and then is outputted from an output terminal 342 as the block line signal c'. The output BORROW is also supplied to the other input of the NAND gate 348. An output signal R of the NAND gate 348 is supplied to a CK terminal of the flip-flop 346. The output from the flip-flop 346 of the logic circuit 360 is outputted from an output terminal 351 as a reset line signal d' i.e. ineffective block signal.

Figure 6:
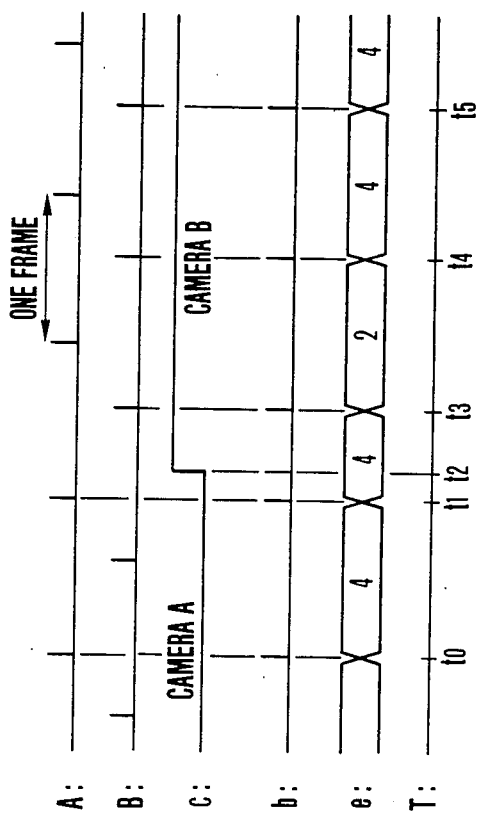
FIG. 6 is a diagram for explaining the operation of the system according to the present invention when an input video signal is asynchronously switched.

The operation in regard to the case where an input video signal is asynchronously switched from A signal to B signal at an arbitrary time will be described with reference to FIG. 6. Symbols A and B represent time positions of the synchronization signal code b of the picture. These time positions are out of phase. Accordingly, where an input signal is switched as indicated by c at time of $t_2$, the number of lines included from time $t_1$ to time $t_3$ is indefinite in every switching. Assuming now that the number of lines from time $t_1$ to time $t_3$ is 315, MOD (315, 8) is equal to 3. As a result, the number of lines e included within the ineffective block is expressed by $(3-1)=2$. During the subsequent time period from $t_3$ to $t_4$, the line number e equal to 4 is again outputted. This line number e is transmitted to the receiving station.

As understood from the foregoing description, the present invention provides a system for effecting a code conversion in block units which is featured below: When a picture frame is divided in block units at the rate of a predetermined number of lines, there is a possibility that there occurs the last allotted block having a number of lines less than the predetermined number of lines. In such a case, the coding system according to the present invention executes a processing to designates the last allotted block as an ineffective block to transmit the number of lines included in the allotted block to a receiving station, thus enabling block formation using an arbitrary number of lines as a unit. Further, in case where an input video signal is asynchronously switched, the present system necessarily executes only a processing per block, thus making it possible to reproduce, on the side of the receiving station, a picture image switched which is free from distortion.

What is claimed is:

1. A coding system to divide a frame of a video signal into a plurality of blocks per a predetermined number of lines to encode each area divided into block, said coding device comprising:
   synchronization detector means for detecting a frame synchronization signal from said picture signal;
   block formation means operative to divide said video signal in block units per said predetermined number of lines by using a picture frame synchronization signal detected by said synchronization detector means as a reference such that when the number of lines included in a block immediately before the subsequent picture frame synchronization signal is less than said predetermined number of lines, said block formation means is operative to designate said block as an ineffective block;

coding means operative to apply a coding processing to the blocks except for said ineffective block designated by said block formation means in accordance with a predetermined coding procedure; and transmission means operative to multiplex coded data outputted from said block formation coding means, position information of the first block immediately after said picture frame synchronization signal, and the number of lines within said ineffective block to transmit the multiplexed signal thus obtained, whereby when said input video signal is asynchronously switched, an operation is executed to vary the number of lines included within only said ineffective block in the signal picture frame immediately after said switching, thus always maintaining an area to be coded at the rate of said predetermined number of lines.

2. A coding system as set forth in claim 1, which further comprises a predictive coding circuit operative to generate a prediction error signal obtained as a difference between said video signal and a predetermined prediction signal.

3. A coding system as set forth in claim 2, wherein said predictive coding circuit includes selector means adapted to input said prediction error signal and a fixed value, whereby when said block formation means produces a ineffective block signal, said selector means selects said fixed value.

4. A coding system as set forth in claim 1, wherein said block formation means is configured as a control pulse generator.

5. A coding system as set forth in claim 4, wherein said control pulse generator is responsive to said frame synchronization signal and a horizontal synchronization signal to produce an ineffective block signal, a block signal, and a signal indicative of number of lines within said ineffective block.

* * * * *

UNITED STATES PATENT AND TRADEMARK OFFICE
CERTIFICATE OF CORRECTION

PATENT NO. : 4,679,081

DATED : July 7, 1987

INVENTOR(S) : Syuzo Tsugane; Mitsuo Nishiwaki

It is certified that error appears in the above-identified patent and that said Letters Patent is hereby corrected as shown below:

Column 4, line 3, delete "c'" and insert therefor --e'--.

Signed and Sealed this

Sixteenth Day of August, 1988

Attest:

DONALD J. QUIGG

Attesting Officer        Commissioner of Patents and Trademarks